United States Patent
Heber et al.

(10) Patent No.: US 6,701,210 B2
(45) Date of Patent: Mar. 2, 2004

(54) METHOD AND CONTROLLER FOR CREATING AND OPTIMIZING FLEXIBLE, TOP-QUALITY CAM-DISK FUNCTIONS DIRECTLY VIA THE CONTROL PROGRAM/ USER PROGRAM

(75) Inventors: Tino Heber, Freiberg (DE); Holger Hüfner, Chemnitz (DE); Gunter Jost, Augustusburg (DE); Raimund Kram, Erlangen (DE)

(73) Assignee: Siemens Aktiengesellschaft (DE)

(*) Notice: Subject to any disclaimer, the term of this patent is extended or adjusted under 35 U.S.C. 154(b) by 232 days.

(21) Appl. No.: 09/943,449

(22) Filed: Aug. 30, 2001

(65) Prior Publication Data

US 2003/0078692 A1 Apr. 24, 2003

(30) Foreign Application Priority Data

Dec. 27, 2000 (DE) .......................... 100 65 422

(51) Int. Cl.⁷ ............................... G06F 19/00
(52) U.S. Cl. ................... 700/189; 700/186; 700/188; 700/194
(58) Field of Search .................. 700/63, 182, 184, 700/186–189, 194

(56) References Cited

U.S. PATENT DOCUMENTS

| | | | | |
|---|---|---|---|---|
| 5,051,913 A | * | 9/1991 | Kume et al. ............... 700/186 |
| 5,060,133 A | * | 10/1991 | Carter, II .................... 700/87 |
| 5,140,236 A | * | 8/1992 | Kawamura et al. ...... 318/568.1 |
| 5,278,767 A | * | 1/1994 | Kishi et al. ................. 700/187 |
| 5,353,232 A | * | 10/1994 | Vollmayr .................... 700/187 |
| 5,723,961 A | * | 3/1998 | Fujino et al. .......... 318/568.15 |
| 5,726,896 A | * | 3/1998 | Jia et al. ..................... 700/187 |
| 6,256,546 B1 | * | 7/2001 | Graham et al. ............... 700/30 |
| 6,542,785 B1 | * | 4/2003 | Honda ......................... 700/187 |
| 2003/0033050 A1 | * | 2/2003 | Yutkowitz ................... 700/189 |

FOREIGN PATENT DOCUMENTS

| | | |
|---|---|---|
| DE | 4218818 | 12/1993 |
| DE | 4323831 | 2/1995 |
| DE | 19642962 | 4/1998 |
| DE | 19841138 | 11/1999 |
| EP | 0774701 | 11/1995 |

* cited by examiner

Primary Examiner—Leo Picard
Assistant Examiner—Elliot Frank
(74) Attorney, Agent, or Firm—Baker Botts LLP

(57) ABSTRACT

A method for creating and/or optimizing a cam-disk function for a controller for controlling a moving machine element of a numerically controlled production machine during its operating time system, movement of the machine element being described in sections by the cam-disk function, comprising defining individual movement sections by segments and/or points, and interpolating between said movement sections in accordance with prescribable interpolation rules; wherein instructions for inserting said segments and points and for prescribing said interpolating rules are provided at the point in time during the operating time of the system of the machine controller.

23 Claims, 2 Drawing Sheets

METHOD AND CONTROLLER FOR CREATING AND OPTIMIZING FLEXIBLE, TOP-QUALITY CAM-DISK FUNCTIONS DIRECTLY VIA THE CONTROL PROGRAM/ USER PROGRAM

FIELD OF THE INVENTION

The invention relates to a method for creating and/or optimizing a cam-disk function for controlling a moving machine element of a numerically controlled production machine or the like in the operating time system of the machine, and to a corresponding controller for such a machine.

BACKGROUND OF THE INVENTION

Curves for controlling machine elements of production machines such as packaging machines, textile machines and the like are conventionally created outside the controller on a separate computer system, or prepared profiles are called up, or the latter are programmed on line via points or simple polynomial functions. When being created externally, the curves are created on a tool and loaded into the controller of these machines, for example as a memory-intensive interpolation point table. In the case of online creation, lists of points are created, prepared profiles are used, or polygons are created via simple polynomial functions.

A disadvantage of such a mode of procedure now resides, firstly, in that no substantial changes to these cam-disk functions can be undertaken in the operating time system of the machine controller. Rather, there is a need for renewed external creation taking account of desired changes on the separate computer system before a transfer into the controller of the production machine is then performed anew. Secondly, it has only been possible so far to create simple prepared profiles or polygons in the controller.

The machine manufacturer equips his production machine with a permanently prescribed functionality which the user can parameterize, or which can be adapted to the production process via appropriate algorithms implemented by the machine manufacturer. An additional computer is required by the machine manufacturer to create these machine programs. The consequence of this is that a machine manufacturer also generally requires an external additional computer in order to adapt or to expand the functionality of a production machine. In particular, so far there has been lacking the possibility of creating or optimizing flexible, top-quality cam-disk functions prescribing the movement of an element of the production machine, on the machine itself.

This limits the flexibility in an undesirable way, and prevents the online creation of top-quality, combined camdisk functions.

SUMMARY OF THE INVENTION

It is therefore the object of the present invention to enable the programming and optimizing of top-quality, combined cam-disk functions via the user program.

This object is achieved according to the present invention by defining individual sections of the movement of machine elements by segments and/or points and interpolating between successive movement sections according to a prescribable interpolation rule. Instructions for inserting segments and points and for prescribing interpolation rules in relation to operating time are provided. Moreover, the programming and optimizing steps are carried out by the machine controller.

It has proved to be advantageous both for the method and for the controller according to the invention when segments are prescribed by a combination of a polynomial and a trigonometric component.

A combination of a polynomial having a polynomial degree of at least six and a sinusoidal function has proved to be particularly favorable in this case as a trigonometric component for defining segments.

Further advantageous refinements of the invention make use of linear connections or cubic splines or Bezier splines as interpolation rules for connection between consecutive movement sections. Such splines are assembled in a piecewise fashion from polynomials.

In order to be able to use the laws of motion, present in normal form, of the VDI standard 2143, the polynomial segments are stored in normal form in a generally valid fashion, and supplementary parameters referring to the respective actual extension for both axial coordinates are allocated.

It has proved, furthermore, to be favorable when the response at the edges of the cam-disk function is prescribed via criteria referring to the continuity of the position and/or the speed and/or the acceleration of the machine element.

According to a further advantageous refinement, scaling ranges and associated scaling factors for these ranges can be prescribed directly in the user program. The scaling ranges can correspond to the segment definitions, but need not do so.

When the parameters for defining the cam-disk function are derived directly from a production process for the machine, a process-adaptive cam-disk generation can be achieved through the invention.

In order to be able to define new curves, in a further advantageous design of the invention, an existing cam-disk function can be reset in the operating time system for the purpose of preparing a new definition of a cam-disk function.

A curve generated or optimized in this way according to the invention is present as a mapping in the memory of the controller and, according to a further advantageous refinement, can be used for a synchronous operation by virtue of the fact that in order to control the moving machine element, a slave shaft thereof follows an assigned main shaft of the machine element in accordance with the defined cam-disk function.

Thus, the invention can be used to reduce substantially the memory location requirement in the controller for application programs and user data by comparison with conventionally stored, copious tables. Moreover, the flexibility of a production machine equipped with the invention is decisively improved in that the functionality at the machine itself can be varied or enhanced. This additionally increases the economic efficiency of the machine.

BRIEF DESCRIPTION OF THE DRAWINGS

Further advantages of the invention will be apparent from the following detailed description thereof, taken in conjunction with the appended drawings in which.

DETAILED DESCRIPTION OF THE INVENTION

In accordance with the invention, a cam-disk function is created in the operating time system of the numerical controller of a machine via a programming option with the aid of specifically provided instructions in the user program. As a result, there is no longer a direct need for an external additional computer specifically devoted to creating cam-disk functions in order to intervene in a cam-disk function profile of an existing automation solution. It is thus possible to create a top-quality, combined cam-disk function with the new instructions in the user program.

For this purpose, cam-disk functions y=f(x) are assembled from a plurality of functions which are prescribed in segments. The movement to be described by a moving machine element is resolved for this purpose into individual consecutive segment sections x1 to xn. These segment sections are then described by functions which can be prescribed from individual points A or segments B.

To connect individual movement sections x1 to xn, an interpolation segment is defined between such points A or segments B by prescribing an interpolation rule C. This can optionally produce a linear connection c1 or a connection via cubic splines c2 or Bezier splines.

Figure 1:
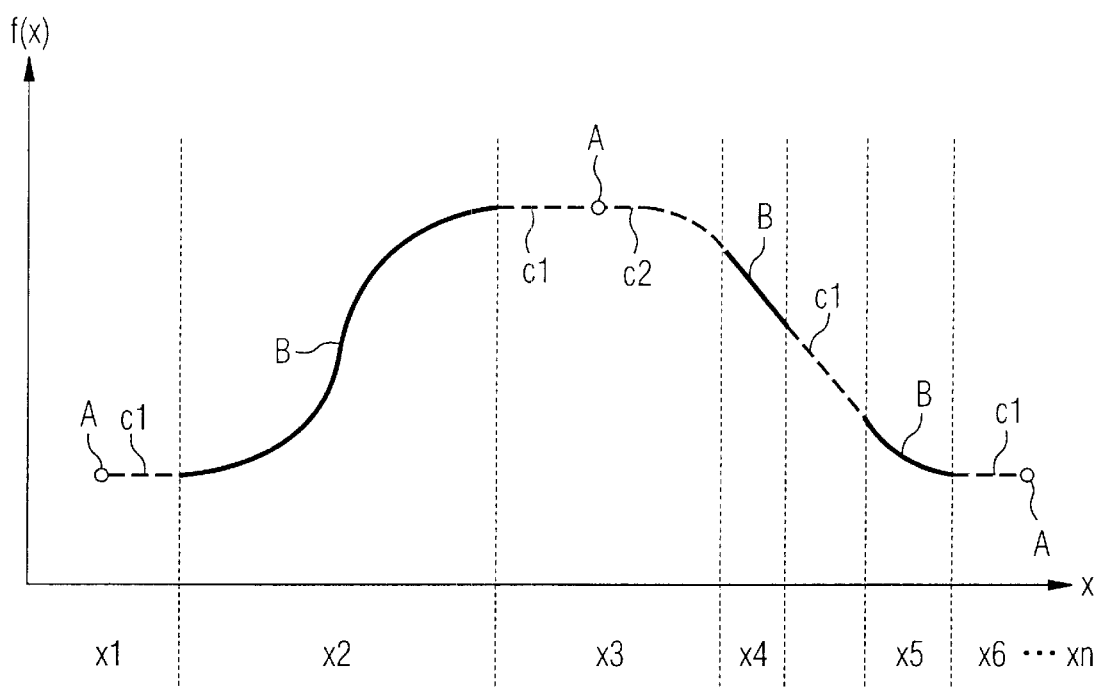
FIG. 1 shows a cam-disk function consisting of a plurality of movement sections connected by interpolation.

FIG. 1 illustrates an example of a cam-disk function f(x), generated in such a way, over the path x, subdivided into movement segments x1 to x6, which function is assembled from individual points A and segments B connected via interpolation segments c1 and c2. In this case, the interpolation segments are arbitrarily assigned to the movement sections with the aid of individual points A.

The interpolation section connecting the individual point A of movement section x1 with the polynomial segment B of the movement section x2 describes a linear connection c1. Following in movement section x3 is a further individual point A, which is likewise connected to the polynomial segment B from x2 via a linear interpolation section c1. Following in section x4 is a linear segment B which is connected to the individual point A from x3 via a cubic spline c2, and connected to a further cubic spline B in movement section x5 via a further straight interpolation connection c1. The movement section x5 is likewise connected to a further individual point A in the movement section x6 via a linear interpolation connection c1.

This shape of curve therefore represents an exemplary cam-disk function f(x) which can be created, supplemented or optimized via appropriate instructions in the operating time system of a machine controller. Such instructions, are, for example, A: _addPointToCam( )

B: _addSegmentToCam( )

C: _interpolateCam( )

D: _setCamScale( )

E: _resetCam( )

and are programmed in the user program, which is then compiled during downloading. Additionally, the response at the curve edges can be prescribed via criteria referring to the continuity of, for example, the position, the speed or the acceleration of the moving machine element.

Cam-disk functions or their curve segments are described as functions which consist of polynomials up to the polynomial degree of 6 or higher and a trigonometric component, in particular a combined trigonometric sinusoidal function, in accordance with the following calculating rule $$y = \sum_{n=0}^{6}(A_n \cdot x^n) + B \cdot \sin(C \cdot x + D). \quad (1)$$

The factors A to D in equation (1) are not to be confused with the previously used reference symbols for the instructions for individual points, segments and interpolation rules etc.

It is thereby achieved, inter alia, that the transitions can be mappped or realized according to VDI Guideline 2143 "Bewegungsgesetze für Kurvengetriebe" ["Laws of motion for cam mechanisms"]. Optimized laws of motion for cam-disk mechanisms, which are optimal for movements in the case of such machines, are specified in VDI Guideline 2143.

As shown in FIG. 1, it is favorable in this case to bring the representation into the normal form normalized to 1 in accordance with $$\{f(p){:}p{\in}[0.1]|f{\in}[0.1]\}. \quad (2)$$

Figure 2:
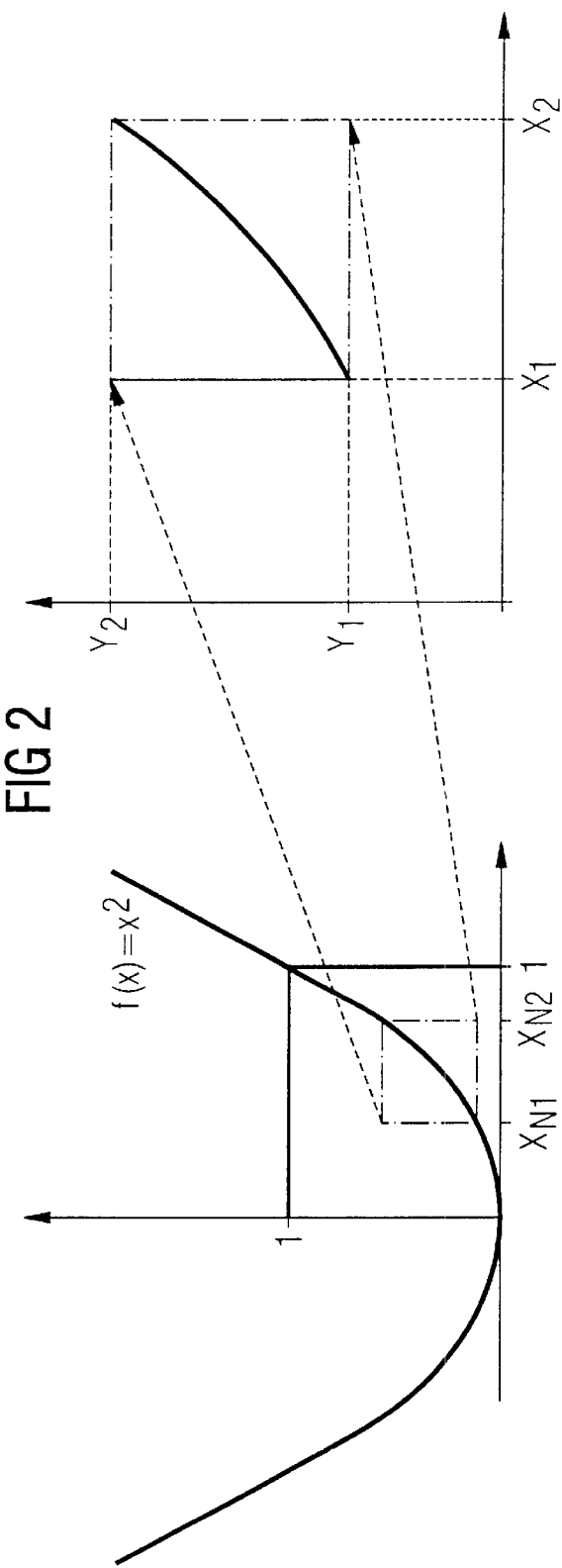
FIG. 2 shows a comparison of a segment of a curve in normal form and its mapping after a transformation.

The representation in FIG. 2 illustrates this transformation with the aid of two contrasting coordinate systems. The left-hand portion of FIG. 2 shows a cam-disk function $f(x)=x^2$ with the corresponding segment in normal form in the first quadrant of the coordinate system. Only the range between XN1 and XN2 is required to describe a corresponding movement section.

The representation produced by the above-described transformation is shown in the coordinate system of the right-hand portion of FIG. 2. The dashed arrows indicate this transformation. The correspondingly marked section is mapped there in the range of X1, Y1 and X2, Y2. Such a segment B is allocated its actual extension on both axial coordinates X and Y (definition and value ranges) via additional parameters.

In addition to the creation of such cam-disk functions directly in the user program, it is also possible to provide further instructions directly in the operating time system in order to define scaling ranges. Thus, a further instruction of the controller serves to scale the overall curve f(x) or individual curve ranges. Again, scaling factors can be prescribed for these ranges directly in the operating time system, as can instructions for defining offset values for the definition range and the value range.

Further instructions serve to activate or deactivate a cam disk in a synchronous function in which a slave shaft of a moving machine element follows its assigned main shaft in accordance with the defined cam-disk function f(x).

With the above functionality in accordance with the present invention, an additional computer system outside the controller is therefore no longer necessary for creating curves to define the movement profile of a machine element. Parameters can be prescribed for curved definition via simple operator communication systems of the controller itself.

As a further advantage of the invention, the possibility is opened up of stipulating parameters or deriving parameters directly from an ongoing process, for example a production process of a production machine. Cam-disk functions f(x) can thus be adapted directly to the process by using parameters derived via the instructions represented above and derived from the process to adapt the cam-disk function. Such a process-adaptive generation of the cam-disk function and optimization of the cam-disk function without an additional computer open up new possibilities with regard to the productivity and flexibility of production machines equipped with such controllers in accordance with the invention. Thus, it is possible, for example, to react to wear phenomena such as, for example, loosening effects, by adaptive matching of the basic cam-disk function to the instructions outlined above.

Figure 3:
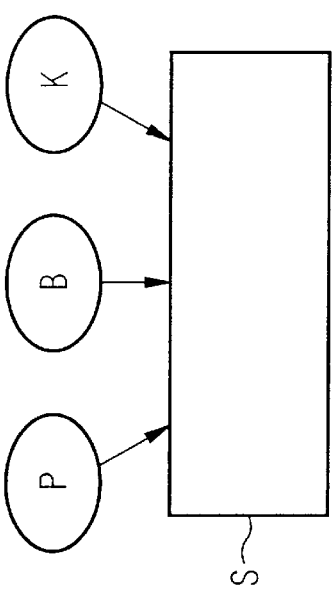
FIG. 3 shows a sketch of the principle of the parameters taken into account by the machine controller in accordance with the invention.

FIG. 3 illustrates these possibilities with the aid of a machine controller S of an arbitrary production machine having the functionality outlined above and the parameters to be taken into account in the case of the creation of a cam disk directly in the operating time system of the controller. Such a machine controller includes an interpolator and can execute movement instructions directly. The controller processes parameters from the machining process P itself, instructions prescribed via an operating system B, and the axial criteria K of the moving machine element, which are prescribed by the machine and the structural design thereof itself.

Appropriate curve creation programs can be stored in libraries by the machine manufacturer in the form of a parameterizable automation program in the controller S. The machine manufacturer programs the cycle on his machine and then makes available to the end user of the production machine, via an operator's panel, input masks with the aid of which it is possible to input this production parameter and optimization parameter. These can then be evaluated in the user program of the machine manufacturer, and the process and the movement of the machine can be optimized.

This then renders the properties of a library function useful for the cam disks f(x1 ... xn), which can be created online. It is therefore possible, via the application programs, for complex cam-disk functions f(x) to be created and optimized in accordance with the prevailing online parameters in the operating time system. An optimal movement synchronism between shafts, for example between a main shaft and slave shafts of a production machine, can be produced with the aid of these cam-disk functions.

We claim:

1. A method for creating and/or optimizing a cam-disk function for a controller for controlling a moving machine element of a numerically controlled production machine during its operating time system, movement of the machine element being described in sections by the cam-disk function, comprising defining individual movement sections by segments and/or points, and interpolating between said movement sections in accordance with prescribable interpolation rules;

wherein instructions for inserting said segments and points and for prescribing said interpolating rules are provided at the point in time during the operating time of the system of the machine controller.

2. The method for creating and/or optimizing a cam-disk function according to claim 1, in which segments are defined by a combination of a polynomial and a trigonometric component.

3. The method for creating and/or optimizing a cam-disk function according to claim 1, in which a combination of a polynomial having at least a polynomial degree of six and a sinusoidal function is used as trigonometric component for defining segments.

4. The method for creating and/or optimizing a cam-disk function according to claim 1, in which a linear connection between consecutive movement sections is prescribed as an interpolation rule.

5. The method for creating and/or optimizing a cam-disk function according to claim 1, in which cubic splines are prescribed as the interpolation rule for connection between consecutive movement sections.

6. The method for creating and/or optimizing a cam-disk function according to claim 1, in which Bezier splines are prescribed as the interpolation rule for connection between consecutive movement sections.

7. The method for creating and/or optimizing a cam-disk function according to claim 3, in which polynomial segments are stored in normal form, and supplementary parameters referring to respective actual extension for both axial coordinates are allocated.

8. The method for creating and/or optimizing a cam-disk function according to claim 3, in which a response at the edges of cam-disk function is prescribed via criteria referring to a continuity of position and/or the speed and/or acceleration of machine element.

9. The method for creating and/or optimizing a cam-disk function according to claim 3, in which scaling ranges and scaling factors for said ranges are prescribed in a control program of the machine.

10. The method for creating and/or optimizing a cam-disk function according to claim 3, in which parameters for defining the cam-disk function are derived directly from a machining process of the machine.

11. The method for creating and/or optimizing a cam-disk function according to claim 3, in which an existing cam-disk function is reset in the operating time system in order to prepare a new definition of a cam-disk function.

12. In combination,

An industrial production machine having a movable machine element, and a controller for controlling movement of said movable machine element in accordance with a cam-disk function, said controller further comprising computing means for creating or optimizing a cam-disk function by defining individual sections of said cam-disk function by segments and/or points, and interpolating between said movement sections in accordance with prescribable interpolation rules, wherein instructions for inserting said segments and points and for prescribing said interpolation rules are provided at a point in time during the operating time of the system of the controller.

13. The controller according to claim 12, wherein said computing means determines segments by means of a combination of a polynomial and a trigonometric component.

14. The controller according to claim 13, wherein the computing means combines a polynomial having at least a polynomial degree of six with a sinusoidal function as trigonometric component in order to define a segment.

15. The controller according to claim 12, in which a linear connection can be interpolated between consecutive movement sections by said computing means.

16. The controller according to claim 12, in which the computing means can be used to interpolate between consecutive movement sections by means of cubic splines.

17. The controller according to claim 12, in which the computing means can be used to interpolate between consecutive movement sections by means of Bezier splines.

18. The controller according to claim 13, including storage means in said controller, in which polynomial segments can be stored in normal form together with supplementary parameters referring to a respective actual extension for both axial coordinates.

19. The controller according to claim 12, in which the controller can prescribe in the operating time system, a response at cam-disk function's edges via criteria referring to a continuity of position and/or speed and/or acceleration of the machine element.

20. The controller according to claim 12, in which the controller can prescribe in the operating time system, scaling ranges and scaling factors for said ranges in the operating time system of the machine.

21. The controller according to claim 12, including means by which a parameters for defining the cam-disk function relative to the operating time can be derived directly from a current machining process, whereby said parameter is formed directly in the control program, or prescribed via an operator's station.

22. The controller according to claim 12, including means for resetting an existing cam-disk function in the controller in the operating time system in order to prepare a new definition of a cam-disk function.

23. The controller according to claim 12, wherein a slave shaft of a moving machine element follows an assigned main shaft of the machine element in accordance with a defined cam-disk function.

* * * * *